US010691077B2

(12) United States Patent
Lagorgette

(10) Patent No.: US 10,691,077 B2
(45) Date of Patent: Jun. 23, 2020

(54) WATCH COMPRISING A MAGNETIC CLAMPING DEVICE

(71) Applicant: ETA SA Manufacture Horlogere Suisse, Grenchen (CH)

(72) Inventor: Pascal Lagorgette, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 93 days.

(21) Appl. No.: 15/725,761

(22) Filed: Oct. 5, 2017

(65) Prior Publication Data

US 2018/0101141 A1 Apr. 12, 2018

(30) Foreign Application Priority Data

Oct. 11, 2016 (EP) .................................... 16193192

(51) Int. Cl.

| | |
|---|---|
| ***G04G 17/04*** | (2006.01) |
| ***G04C 10/00*** | (2006.01) |
| ***H01M 2/10*** | (2006.01) |
| ***G04C 3/10*** | (2006.01) |
| ***G04G 17/06*** | (2006.01) |

(52) U.S. Cl.

CPC ............. *G04G 17/04* (2013.01); *G04C 3/101* (2013.01); *G04C 10/00* (2013.01); *G04G 17/06* (2013.01); *H01M 2/1044* (2013.01)

(58) Field of Classification Search

CPC ........ G04C 3/008; G04G 17/02; G04G 17/04; G04G 17/06; H01M 2/1044

See application file for complete search history.

(56) References Cited

U.S. PATENT DOCUMENTS 4,763,308 A * 8/1988 Morata .................. G04C 10/00 368/204
4,784,926 A * 11/1988 Sato .................... H01M 2/1022 429/96
5,203,709 A * 4/1993 Huang .................. H01M 2/105 429/100
5,569,549 A * 10/1996 Redford ..................... C09J 9/02 429/1

(Continued)

FOREIGN PATENT DOCUMENTS

CN 201233941 Y * 5/2009
JP 2000-30810 1/2000
JP 3188425 U * 1/2014

OTHER PUBLICATIONS

Paper battery holder with magnets, Sep. 6, 2015, Chibitronics, retrieved from https://chibitronics.com/paper-battery-holder-with-magnets/ on Mar. 4, 2019, full document (Year: 2015).*

(Continued)

*Primary Examiner* — Daniel P Wicklund
(74) *Attorney, Agent, or Firm* — Oblon, McClelland, Maier & Neustadt, L.L.P.

(57) ABSTRACT

A watch including a case containing a plate and an electronic module powered by a button cell battery, a conductor electrically connecting the button cell battery to the electronic module and a clamping device capable of ensuring an electrical connection between the button cell battery and the conductor, wherein the clamping device includes a magnet.

20 Claims, 2 Drawing Sheets

(56) References Cited

U.S. PATENT DOCUMENTS

| | | | | |
|---|---|---|---|---|
| 5,931,693 | A * | 8/1999 | Yamazaki | H01M 2/1044 429/96 |
| 5,993,248 | A * | 11/1999 | Bethurum | H01M 2/1044 439/500 |
| 6,186,353 | B1 * | 2/2001 | Crocker | H01M 2/1022 220/345.4 |
| 6,217,339 | B1 | 4/2001 | Tsubata | |
| 2002/0064098 | A1 * | 5/2002 | Marquis | G04C 10/00 368/88 |
| 2008/0002528 | A1 * | 1/2008 | Andren | G04G 17/045 368/241 |
| 2012/0051193 | A1 | 3/2012 | Yu | |
| 2012/0206088 | A1 | 8/2012 | Park | |
| 2014/0273546 | A1 * | 9/2014 | Harmon | H01R 13/6205 439/39 |
| 2016/0329001 | A1 * | 11/2016 | Sundholm | G06Q 10/08 |
| 2018/0004472 | A1 * | 1/2018 | Sundholm | G06F 3/147 |

OTHER PUBLICATIONS

Matsuyama, S, English Translation of JP 3188425 U, originally published on Jan. 23, 2014, full document (Year: 2014).*

European Search Report dated Mar. 13, 2017 in European Application 16193192.8, filed on Oct. 11, 2016 (with English Translation of Categories of cited documents).

* cited by examiner

WATCH COMPRISING A MAGNETIC CLAMPING DEVICE

This application claims priority from European Patent Application No. 16193192.8 filed on Oct. 11, 2016, the entire disclosure of which is hereby incorporated herein by reference.

FIELD OF THE INVENTION

The present invention relates to the field of horology. It more particularly concerns a watch which includes an electronic module powered by a button cell battery.

BACKGROUND OF THE INVENTION

Most electronic watches include movements that are powered by so-called "button cell" batteries which have a limited life and which therefore have to be regularly replaced. The batteries are generally disposed inside a cylindrical housing arranged in the watch plate. Metal clamps are devised to exert significant pressure on the sides of the battery to achieve a permanent electrical contact and to hold the battery in position. The clamps are obtained by stamping and bending and their geometry is specifically adapted to that of the battery and to the movement with which they are intended to cooperate. However, this clamping device has several drawbacks. It is not generally possible to use batteries of different sizes with the same clamp, so that the replacement batteries must be identical in every respect to the original battery. Expensive stamping tools must be developed for each new application. The clamps are relatively fragile and their small dimension makes them difficult to handle. They may be deformed or broken accidentally by the user when the battery is replaced, which will cause loss of contact and result in a partial or total malfunction of the watch. Example embodiments of such metal clamps can be found in CH Patent 508909 or FR Patent 2460499.

It is an object of the present invention to overcome the aforecited drawbacks of the prior art by proposing a watch provided with an electronic movement or an electronic module comprising a new type of clamping device for its energy source formed by a battery, particularly a button cell battery.

SUMMARY OF THE INVENTION

To this end, the invention concerns a watch comprising a case containing a plate and an electronic module powered by a battery, particularly of the button cell type, a conductor electrically connecting the battery to the electronic module and a clamping device capable of ensuring an electrical connection between the battery and the conductor. In an original manner, the clamping device includes a magnet.

This design has the advantage of facilitating and safeguarding battery changes and of being compatible with batteries of different size.

BRIEF DESCRIPTION OF THE DRAWINGS

Other features and advantages of the invention will appear upon reading the description of example embodiments, given by way of non-limiting illustration, with reference to the annexed drawings, in which.

DETAILED DESCRIPTION

Figure 1:
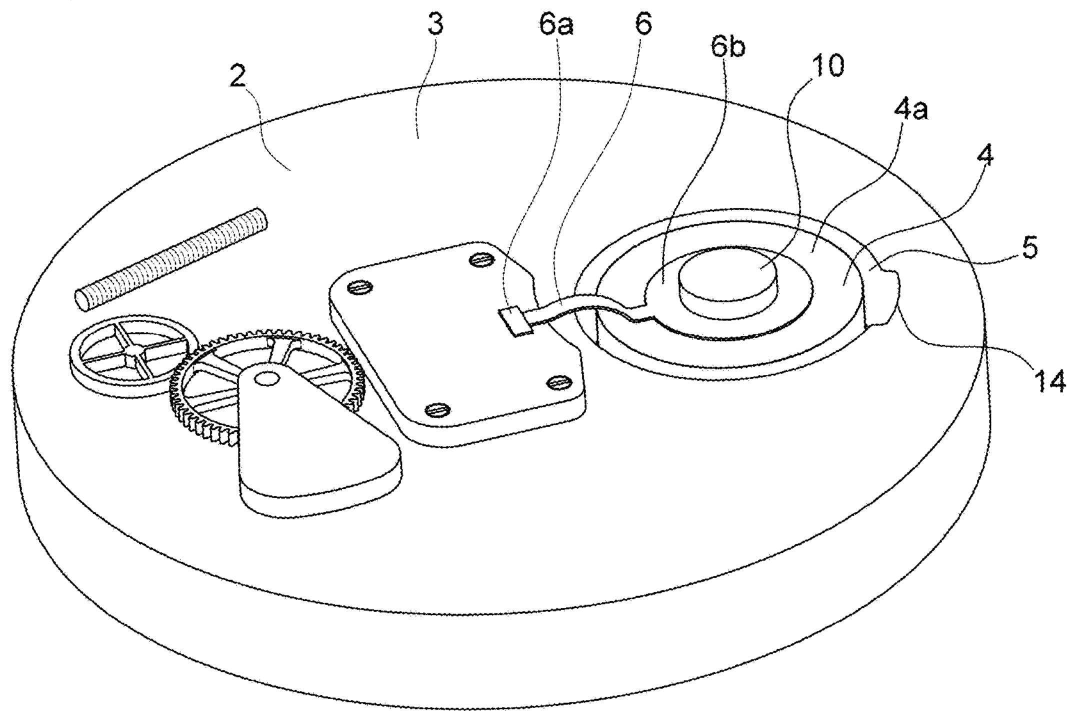
FIG. 1 is a perspective bottom view of a movement of a watch according to the invention.

An electronic movement or an electronic module of a watch is represented in FIG. 1 which shows a plate 2 in which is arranged a recess 5, of cylindrical shape, housing a button cell battery 4 intended to power an electronic module 3, conventionally a printed circuit board. A notch 14 facilitates the removal of the battery from its housing. An electrical conductor 6 taking the form of a flat flexible cable is intended to electrically connect electronic module 3 to a pole of battery 4. A first end 6*a* of conductor 6 is connected to electronic module 3, typically using a connector or a solder. A second end 6*b* of conductor 6 has a visible conductive surface that comes into contact with a wall 4*a* of battery 4. The connection to the second pole of battery 4 is not represented. A clamping device taking the form of a magnet 10 is positioned on connector end 6*b*, opposite wall 4*a* of battery 4 which is made of a ferromagnetic material. The magnetizing force between magnet 10 and wall 4*a* allows end 6*b* of connector 6 to be pressed and held against wall 4*a* of battery 4.

Figure 2:
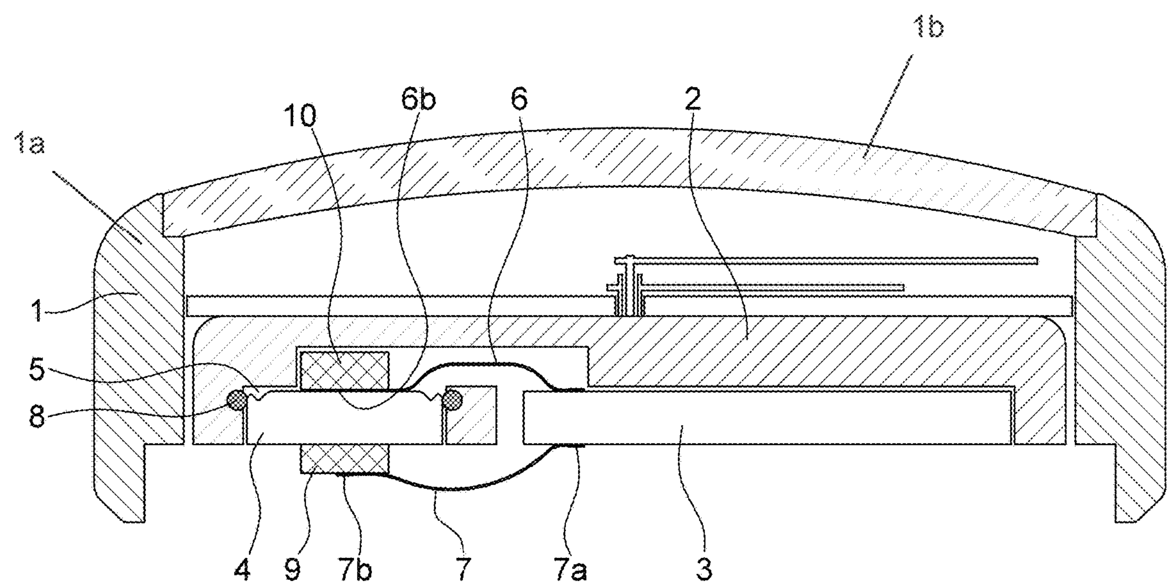
FIGS. 2 to 4 represent cross-sectional views of several variants of a watch according to the invention.

FIG. 2 shows a schematic cross-sectional view of a watch according to the invention in which only details useful for understanding the invention appear. This watch includes a case 1 whose middle part 1*a* and crystal 1*b* are represented, in addition to a movement located inside case 1. An electronic module 3 is mounted on a plate 2. The latter is powered by a button cell battery 4 located inside a recess 5 in the plate. Electrical conductors 6, 7 connect the two terminals of battery 4 to electronic module 3.

According to a particular embodiment of the invention, battery 4 is held in place inside recess 5 by means of an O-ring joint 8, placed in a groove arranged in the wall of recess 5. It is evident that any other fixing means could be used for holding the battery, such as, for example, deformable elastic means.

According to a first variant embodiment corresponding to the configuration presented in FIG. 1, one end 6*b* of a conductor 6 is clamped between a magnet 10 and battery 4. End 6*b* has a visible conductive path, preferably, gold-plated, which is held in contact with battery 4 by the pressure exerted by magnet 10. The conductor is a flat flexible FFC cable but could also be a wire or a metal clamp. To facilitate assembly and remove the risk of end 6*b* of conductor 6 being incorrectly positioned or moving under magnet 10, magnet 10 may be fixed to end 6*b* by any means, such as soldering or adhesive bonding.

According to a second variant embodiment, one end 7*b* of an electrical conductor 7 is fixed to a magnet 9 which is in turn fixed by magnetic force to one side of battery 4. In this configuration, magnet 9 is made of a conductive material or is coated with a conductive surface such as a gold plating to transmit the electrical current from battery 4 to conductor 7. The fixing of the conductor to the magnet is achieved by soldering, preferably by a robotic "pick and place" soldering means. In the case where conductor 7 or only end 7*b* thereof is formed by a metal clamp, magnet 9 may also be crimped onto the clamp. The other end 7*a* of conductor 7 is connected to an electronic module 3 by a solder or any other assembly means allowing transmission of an electric current.

Figure 3:
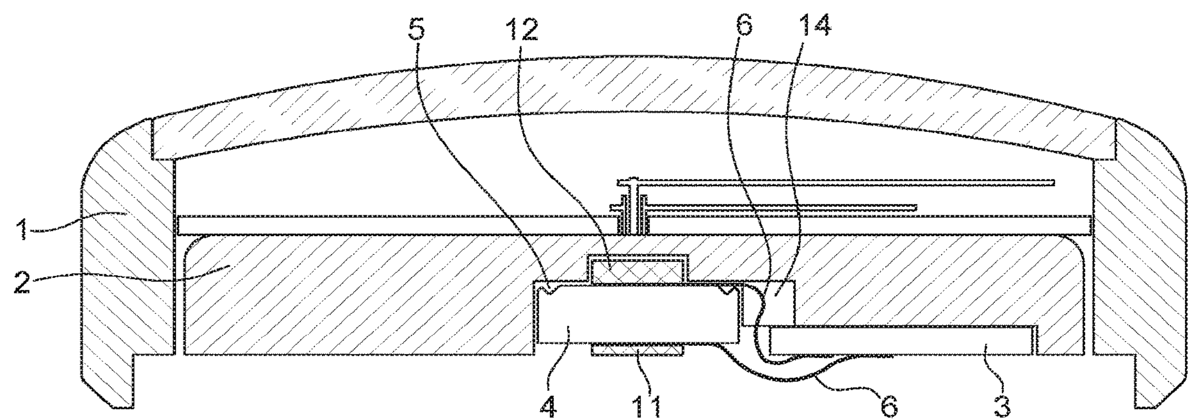

FIG. 3 shows other variant embodiments of the invention. According to a third variant, magnet 11 is a magnetic strip whose length is at least five times its thickness. Preferably, the magnetic strip is a flexible strip. The reduction in magnetizing pressure on a magnetic strip of small thickness can be offset by the increase in the magnetized surface area so much so that the total contact force can be equivalent to that of a conventional magnet. This type of magnet has the advantage of being able to be gradually peeled off with a greatly reduced traction force compared to a rigid magnet having the same magnetizing force. This thus limits the risk of conductor 6 being pulled off when the magnet is detached. Due to its small thickness, the use of a magnetic strip 11 also allows the invention to be implemented in ultra-thin watches.

The various solutions presented until now make it possible to make a removable clamping device capable of ensuring an electrical connection between a button cell battery and a conductor. According to another advantageous aspect of the invention represented in FIGS. 3 and 4, a magnet 12 is fixed to the plate 2 by any suitable means. Alternatively, the magnet could be integral with another fixed part of the watch, such as the case middle. A conductor 6 electrically connects battery 4 to module 3 in one of the configurations described above. In this particular configuration, the clamping device, in addition to ensuring an electrical connection between battery 4 and electronic module 3, holds button cell battery 4 in place inside recess 5 in plate 2. The magnetizing force is sufficient to ensure the fixing of the battery without requiring the use of other retaining means. Battery 4 can be detached from magnet 12 by applying pressure on the periphery of battery 4 to tilt it or by inserting a suitable tool into notch 14. The insertion and removal of battery 4 in the watch is thereby facilitated.

Figure 4:
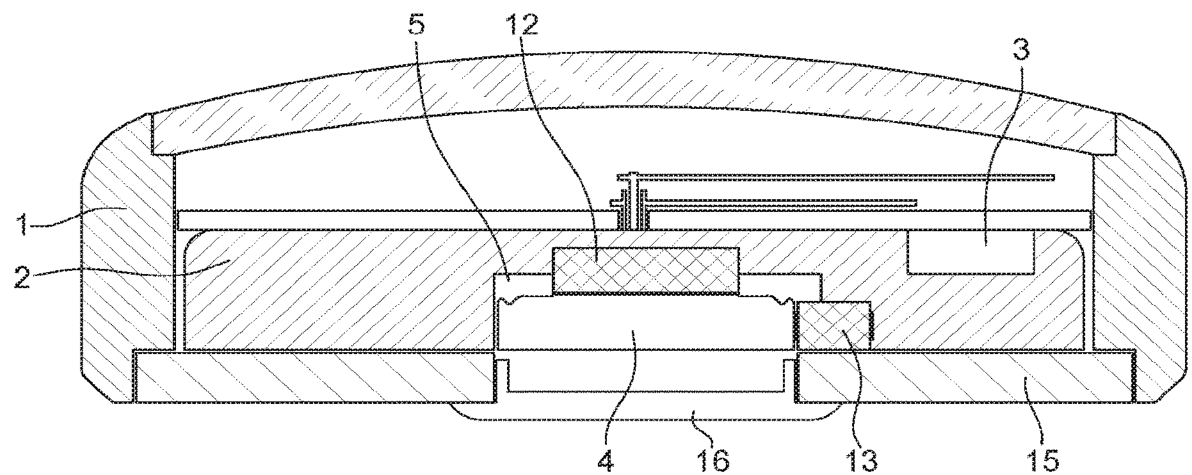

According to another variant embodiment presented in FIG. 4, a magnet 13 is positioned facing the lateral side of a battery 4 which is electrically connected to the side of the battery opposite to that facing magnet 12. The positioning of battery 4 in the plane parallel to the movement can be obtained by a magnet forming a diehedral or by two magnets having non-parallel faces. The watch case also includes a back cover 15 comprising a battery hatch 16. Battery 4 is set in position once hatch 16 has been removed, simply by placing battery 4 inside recess 5. The final positioning of battery 4 and the electrical connections are obtained automatically through the action of magnets 12 and 13 without the need to handle any element inside the watch. This configuration makes it possible to simplify the insertion and connection of the battery, and to remove the risk of damage to the movement or the conductors encountered once the watch is opened.

In the different variant embodiments presented, button cell battery 4 was positioned parallel to the movement. It could also be positioned in another orientation, for example perpendicularly to the movement.

It is evidently possible to combine the different variant embodiments presented and that of the prior art to create an electrical clamp on each of the battery poles. In particular, a first clamp could be made on the bottom of the battery using a magnet and a second electrical clamp on the lateral side of the battery using an elastically deformed metal strip.

Advantageously, as a result of its constant magnetizing force, the magnetic clamping device of the invention makes it possible to achieve a permanent electrical contact and to eliminate the risk of poor contact caused by the relaxation over time of elastic stresses in prior art clamps or by any plastic deformation following mishandling of the clamps during replacement of the battery. It simplifies and safeguards operations to replace the battery in the watch through easy handling of the magnetized contacts or by removing manual operations to connect the battery.

The button cell batteries are cylindrical in shape, of variable thickness and diameter. Since the clamping of the conductor onto the battery is achieved by a magnetizing force on a surface of the battery, it is not dependent on the battery dimensions as is the case for a mechanical clamp where a reaction force is applied on the side opposite to that which receives the action of the clamp. Advantageously, unlike the solutions of the prior art, the magnetic clamping device of the invention thus makes it possible to use batteries of different diameter and thickness. The configuration with a fixed magnet capable of holding the battery is particularly suitable for using batteries of different sizes.

Alternatively, the same clamping device comprising a conductor and a magnet can be used in different watches intended to receive batteries of different size. This makes it possible to spare the use of specific expensive tools during the development of a new watch, by reusing existing clamps.

Advantageously, the conductors used in the invention are flexible and electrically insulated, unlike prior art clamps. The result is a simplification in the design of movements and the arrangement of two conductors with respect to one another. The conductors may, for example, easily be connected at two close points on the same side of the electronic module and run close to each other as is the case in FIG. 3, without the need to provide additional insulators. It is also easier to position the battery in a remote and independent manner with respect to the position of the electronic module and to place it at any point in the watch.

There is therefore proposed an electronic watch integrating a versatile electrical clamping device which facilitates and safeguards battery changing operations while reducing manufacturing costs.

What is claimed is:

1. A watch comprising:

a case comprising a crystal and a middle part, the middle part containing a plate and an electronic watch movement positioned entirely within the plate and powered by a cylindrical battery positioned entirely within the plate;

a conductor electrically connecting the battery to the electronic watch movement; and a clamping device capable of ensuring an electrical connection between the battery and the conductor, wherein the clamping device includes a first magnet and a second magnet, said first magnet being positioned entirely within the plate and directly over a top face of the battery and the conductor such that a magnetizing force between the first magnet and the battery ensures electrical conduction between the first magnet and the conductor, said second magnet being positioned directly under a bottom face of the battery.

2. The watch according to claim 1, wherein the conductor is flexible.

3. The watch according to claim 2, wherein the conductor is a flat cable.

4. The watch according to claim 1, wherein a first end of the second magnet is directly attached to the battery and the conductor is fixed to a second end of the second magnet.

5. The watch according to claim 4, wherein the first magnet is placed between the conductor and the battery.

6. The watch according to claim 5, wherein the first magnet is gold plated.

7. The watch according to claim 1, wherein the conductor is placed between the first magnet and the battery.

8. The watch according to claim 1, wherein the first magnet includes a conductive surface.

9. The watch according to claim 8, wherein the first magnet is made of a conductive material.

10. The watch according to claim 1, wherein the conductor is electrically insulated.

11. The watch according to claim 1, wherein the second magnet is a magnetic strip whose length is at least five times the thickness of the second magnet.

12. The watch according to claim 1, wherein the watch includes an O-ring joint arranged to hold the battery.

13. The watch according to claim 1, wherein the magnet is fixed directly to the plate.

14. The watch according to claim 1, wherein the case includes a back cover and the electronic watch movement, the battery, the first magnet, and the second magnet are positioned within the case.

15. The watch according to claim 14, wherein the back cover of the case includes a battery hatch, and the battery is configured to be inserted into the case through the back cover when the battery hatch has been removed.

16. The watch according to claim 1, wherein a wall of the battery is made of ferromagnetic material.

17. The watch according to claim 1, wherein the battery is cylindrical in shape and positioned in a recess in the plate.

18. The watch according to claim 17, wherein a second end of the conductor is circular and in direct contact with the battery, wherein the first magnet is cylindrical, wherein a diameter of the first magnet is smaller than a diameter of the second end of the conductor, and wherein the diameter of the second end of the conductor is smaller than a diameter of the battery.

19. The watch according to claim 1, wherein the second magnet protrudes out of the plate.

20. The watch according to claim 1, wherein the electronic watch movement is positioned laterally next to the battery within the plate, the conductor that is clamped to the battery by the first magnet includes an end that is directly positioned on a top face of the electronic watch movement, and a conductor that is clamped to the battery by the second magnet includes an end that is directly positioned on a bottom face of the electronic watch movement.

* * * * *